(12) United States Patent
Lu et al.

(10) Patent No.: US 10,448,332 B2
(45) Date of Patent: Oct. 15, 2019

(54) WAKE-UP FOR D2D COMMUNICATION

(71) Applicant: Telefonaktiebolaget LM Ericsson (publ), Stockholm (SE)

(72) Inventors: Qianxi Lu, Beijing (CN); Shaohua Li, Beijing (CN); Xinghua Song, Beijing (CN); Stefano Sorrentino, Solna (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/529,411

(22) PCT Filed: Dec. 2, 2015

(86) PCT No.: PCT/SE2015/051301
§ 371 (c)(1),
(2) Date: May 24, 2017

(87) PCT Pub. No.: WO2016/089294
PCT Pub. Date: Jun. 9, 2016

(65) Prior Publication Data
US 2017/0325167 A1    Nov. 9, 2017

(30) Foreign Application Priority Data
Dec. 2, 2015 (WO) ................ PCT/CN2014/092845

(51) Int. Cl.
*H04W 4/00* (2018.01)
*H04W 52/02* (2009.01)
(Continued)

(52) U.S. Cl.
CPC ... *H04W 52/0229* (2013.01); *H04W 52/0235* (2013.01); *H04W 76/14* (2018.02);
(Continued)

(58) Field of Classification Search
None
See application file for complete search history.

(56) References Cited

U.S. PATENT DOCUMENTS 10,004,064 B2 *  6/2018  Kim
2008/0307240 A1  12/2008  Dahan et al.
(Continued)

FOREIGN PATENT DOCUMENTS

WO     2014092612 A1    6/2014

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.0.0, Dec. 2013, 1-57.
(Continued)

*Primary Examiner* — Farah Faroul
(74) *Attorney, Agent, or Firm* — Sage Patent Group

(57) ABSTRACT

There is disclosed a method for operating a wireless device (10), the wireless device (10) being D2D enabled. The method comprises entering, by the wireless device (10), an energy-saving mode; monitoring, by the wireless device (10), a pre-defined channel for a D2D wake-up signal at pre-defined times during the energy-saving mode; determining, by the wireless device (10), if a received wake-up signal is intended for the wireless device; and performing, by the wireless device (10), a wake-up procedure for D2D communication. There are also disclosed related devices and methods.

5 Claims, 10 Drawing Sheets

(51) Int. Cl.
*H04W 76/28* (2018.01)
*H04W 92/18* (2009.01)
*H04W 76/14* (2018.01)

(52) U.S. Cl.
CPC ............ *H04W 76/28* (2018.02); *H04W 92/18* (2013.01); *Y02D 70/00* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/24* (2018.01)

(56) References Cited

U.S. PATENT DOCUMENTS

| | | | |
|---|---|---|---|
| 2009/0122737 A1 | 5/2009 | Twitchell, Jr. | |
| 2013/0272182 A1* | 10/2013 | Li | H04W 28/02 370/311 |
| 2014/0036876 A1* | 2/2014 | Li | H04W 4/70 370/336 |
| 2014/0127991 A1* | 5/2014 | Lim | H04W 76/023 455/39 |
| 2014/0295858 A1* | 10/2014 | Li | H04W 74/08 455/450 |
| 2014/0301263 A1* | 10/2014 | Ji | H04W 52/0216 370/311 |
| 2014/0334354 A1* | 11/2014 | Sartori | H04W 8/005 370/280 |
| 2015/0111586 A1* | 4/2015 | Sorrentino | H04W 72/042 455/450 |
| 2015/0215757 A1* | 7/2015 | Miskiewicz | H04W 4/90 455/404.1 |
| 2016/0007335 A1* | 1/2016 | Chun | H04W 8/005 370/336 |
| 2016/0050624 A1* | 2/2016 | Tirronen | H04W 52/0216 370/311 |
| 2016/0112858 A1* | 4/2016 | Nguyen | H04W 8/005 370/329 |
| 2016/0150507 A1* | 5/2016 | Kim | H04W 72/04 455/450 |
| 2016/0192420 A1* | 6/2016 | Kim | H04W 74/00 370/329 |
| 2016/0219541 A1* | 7/2016 | Chatterjee | H04W 76/18 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.6.0, Dec. 2013, 1-34.

3GPP, "3rd Generation Partnership Project; Technical Specification Group Services and System Aspects; Proximity-based services (ProSe); Stage 2 (Release 12)", 3GPP TS 23.303 V12.1.0, Jun. 2014, 1-60.

* cited by examiner

WAKE-UP FOR D2D COMMUNICATION

TECHNICAL FIELD

This disclosure pertains to wake-up of a wireless device for D2D (device-to-device) communication and related methods, as well as related devices and arrangements in the field of wireless telecommunication.

BACKGROUND

Local IP based services may be accessed in the home, office, public hot spot or even outdoor environments. One of the important use cases for the local IP access and local connectivity involves the direct communication between devices in the close proximity (typically less than a few 10s of meters, but sometimes up to a few hundred meters) of each other. It should be noted that such communication does not necessarily required use of IP technology.

This direct mode or device-to-device (i.e. D2D) enables a number of potential gains over the traditional cellular technique, because D2D devices may be much closer to one another than cellular devices that have to communicate via cellular access point (e.g., eNB):

- Capacity gain: First, radio resources (e.g. OFDM resource blocks) between the D2D and cellular layers may be reused (reuse gain). Second, a D2D link uses a single hop between the transmitter and receiver points as opposed to the 2-hop link via a cellular AP (hop gain).
- Peak rate gain: due to the proximity and potentially favorable propagation conditions high peak rates could be achieved (proximity gain);
- Latency gain: When the UEs communicate over a direct link, eNB forwarding is short cut and the end-to-end latency can decrease.

D2D communication or operation may also be called direct link or direct mode communication or operation or peer-to-peer communication or operation or sidelink communication or operation or ProSe (proximity services) communication or operation.

A wireless connection for D2D operation or communication may be called sidelink, it may refer to a direct communication link and/or radio link between two wireless devices or UEs (user equipment). D2D communication and/or such a link may generally be provided via unicast, multicast and/or broadcast.

In the following, the term user equipment (UE) may be interchanged for wireless device and vice versa. A UE or wireless device may be a D2D enabled or capable device.

SUMMARY

There are disclosed approaches allowing a wireless device to suspend D2D operation and/or going into an energy-saving mode, the approaches allowing to lead the wireless device reliably out of the energy-saving mode (waking it up) if D2D communication with the wireless device is required. This allows saving energy also in the D2D domain, providing the user with a longer useable time of a battery charge, while allowing the wireless device to be available for D2D communication even when in the energy-saving mode.

There is disclosed a method for operating a wireless device, the wireless device being D2D enabled. The method comprises entering, by the wireless device, an energy-saving mode. The method also comprises monitoring, by the wireless device, a pre-defined channel for a D2D wake-up signal at pre-defined times during the energy-saving mode, as well as determining, if a received wake-up signal is intended for the wireless device. Furthermore, the method comprises performing, by the wireless device, a wake-up procedure for D2D communication.

Also, a wireless device for a wireless communication network is described. The wireless device is D2D enabled. Moreover, the wireless device is adapted for entering an energy-saving mode, and is further adapted for monitoring a pre-defined channel for a D2D wake-up signal at pre-defined times during the energy-saving mode. The wireless device is further adapted for determining if a received wake-up signal is intended for the wireless device; and for performing a wake-up procedure for D2D communication.

In addition, a method for operating a network node in a wireless communication network is proposed. The method comprises configuring a D2D enabled wireless device for a wake-up procedure and/or for performing a method for operating a wireless device as described herein.

A network node for a wireless communication network may be contemplated. The network node is adapted for configuring a D2D enabled wireless device for a wake-up procedure and/or for performing a method as disclosed herein.

Moreover, a program product comprising code executable by control circuitry is discussed, the code causing the control circuitry to perform and/or control any one of the methods described herein.

There is also disclosed a carrier medium arrangement carrying a program product as disclosed herein and/or code executable by control circuitry, the code causing the control circuitry to perform and/or control any one of the methods disclosed herein.

BRIEF DESCRIPTION OF THE DRAWINGS

The drawings are provided for illustrative purposes and are not intended to limit the scope of this disclosure. In the figures of the drawings.

DETAILED DESCRIPTION

Figure 1:
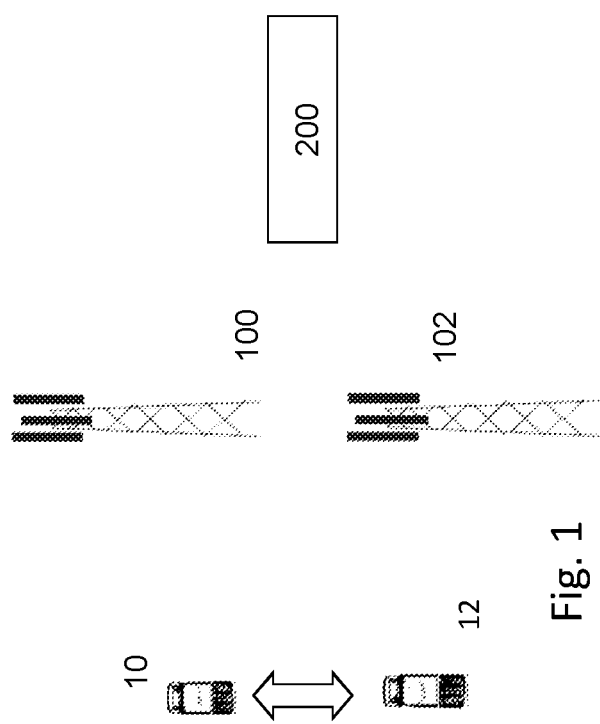
FIG. 1 shows an exemplary first communication link setup.

The term "energy-saving mode" may generally refer to a mode of operating a wireless device in which a power-consuming part or component, in particular a receiver or receiver circuitry (and/or transceiver or transceiver circuitry) of the wireless device is intermittently turned off. A device or part or component may be considered to be turned off if it is not supplied with power/electrical energy and/or operated or supplied with limited power or power below a level needed or used for full activity (e.g. reception of signals, e.g. with full and/or prescribed and/or pre-determined and/or desired gain) and/or operated in a low power mode. For example, an amplifier may be turned off.

A component or device or part may be considered to be turned off intermittently, if during a pre-determined timescale (e.g. frame or subframe) of operation it is switched at least once between turned on and turned off.

During an energy saving mode, the component or part or device may be turned off and/or on periodically and/or in regular intervals and/or at pre-determined and/or recurring times, which may be configured by a network or network node and/or be pre-determined by a standard and/or depend on a UE id as described below.

Operating a receiver or receiving circuitry of a wireless device with discontinuous reception may be considered as operating in an energy saving mode. Discontinuous reception may be considered to be an energy saving mode. An energy saving mode may also be called sleep mode.

A wireless device may comprise one or more than one receivers or receiver circuitries. An energy saving mode may pertain to at least one, only some or all of the receivers, in particular one or more than one receivers intended and/or configured for D2D operation, e.g. reception.

Entering an energy saving mode may comprise configuring the wireless device to operate in such a mode, in particular to intermittently turn on and off a receiver and/or receiver circuitry (receiver or receiver circuitry may generally refer to a component or device or circuitry with corresponding functionality, e.g. a transceiver or transceiver circuitry). A wireless device may be adapted for such entering and/or comprise a corresponding entering module.

Monitoring a pre-defined channel may comprise turning on and/or using a receiver to listen for and/or receive signals, in particular a D2D wake-up signal, on the channel. It may be performed during an energy saving mode, in particular during a time the receiver is turned on. A wireless device may be adapted for such monitoring and/or comprise a corresponding monitoring module.

A pre-defined channel may be a communication channel, which may be defined and/or use pre-defined resources and/or be a channel defined by a standard, e.g. LTE. A channel may generally comprise or be a physical and/or transport and/or logical channel. A pre-defined channel may be defined and/or determined and/or configured (e.g. for a wireless device) by a network, e.g. a network node and/or be pre-configured on a wireless device, e.g. information pre-defining the channel may be stored in a memory of the wireless device. A communication channel or channel may in particular be a physical channel, which may be defined by and/or comprise a set of resource elements (of time/frequency resources), e.g. defined and/or configured by the network or a network node like a base station, in particular an eNodeB.

Determining if a received signal is intended for a wireless device or UE may comprise checking if it is addressed to the wireless device or UE, e.g. by reading a target address and/or based on the time of reception. A wireless device may be adapted for such determining and/or comprise a corresponding determining module.

One example for DRX for cellular communication is described in 3GPP specifications for LTE/E-UTRAN, which specify procedures for discontinuous reception (DRX) which are meant to enable UE power savings and conserve battery power. The phone device may for lengthy and/or reoccurring periods disable its receiver and just discontinuously monitor the downlink channels during short phases. E-UTRAN DRX is characterized by the following:

1. Short on-duration phases in which data transfer may start. UE will monitor the control channel in this phase. The device may turn off its receiver and enter a low energy state if data does not occur. Whenever the UE detects data during its on-duration reception of DL-SCH, it starts an inactivityTimer and shortCycleTimer aiming to extend the active-time.
2. Periodic repetition of a short on-duration phase followed by a possible period of (drx-)inactivity period.
3. The lengths of on-duration, inactivityTimer and shorCycleTimer are fixed by the RRC configuration of the UE, while the active-time is of varying lengths instantaneously based on scheduling decisions.

Figure 7:
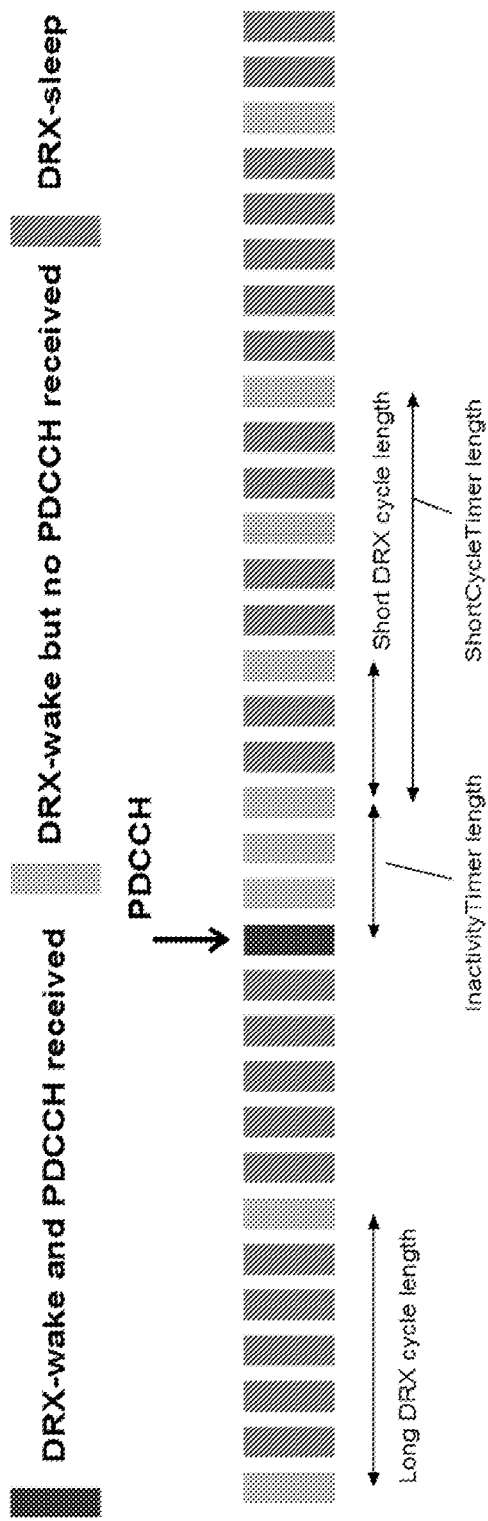
FIG. 7 shows a traditional DRX mechanism for cellular communication.

FIG. 7 shows a traditional DRX mechanism for cellular communication.

In order for the UEs in RRC idle mode (not connected for cellular communication) to both save power and be able to receive messages from E-UTRAN to wake up when there is DL data arrived, a paging mechanism is designed in LTE. UEs in idle mode monitor the PDCCH channel for an RNTI value used to indicate paging: the P-RNTI. The UE only needs to monitor the PDCCH channel at certain UE-specific occasions (i.e. at specific subframes within specific radio frames). At other times, the UE may apply DRX, meaning that it can switch off its receiver to preserve battery power. The E-UTRAN configures which of the radio frames and subframes are used for paging. Each cell broadcasts a default paging cycle. In addition, upper layers may use dedicated signalling to configure a UE-specific paging cycle. If both are configured, the UE applies the lowest value. The UE calculates the radio frame (the Paging Frame (PF)) and the subframe within that PF (the Paging Occasion (PO)), which E-UTRAN applies to page the UE as follows:

SFN mod $T=(T/N)\times(UE\_ID \bmod N)$

Where T=UE DRX cycle (i.e. paging cycle)=min(Tc, Tue), N=min(T, nB), and Ns=max(1, nB/T). The following table is an example of calculated PF and PO.

TABLE 1

Examples for calculation of paging frames and subframes

| Case | UE_ID | $T_c$ | $T_{ue}$ | T | nB | N | Ns | PF | i_s | PO |
|---|---|---|---|---|---|---|---|---|---|---|
| A | 147 | 256 | 256 | 256 | 64 | 64 | 1 | 76 | 0 | 9 |
| B | 147 | 256 | 128 | 128 | 32 | 32 | 1 | 76 | 0 | 9 |
| C | 147 | 256 | 128 | 128 | 256 | 128 | 2 | 19 | 1 | 4 |

Fixed SA monitoring pattern in Rel-12 ProSe communication

In Rel-12, the ProSe communication (D2D communication) is limited to broadcast type communication, and more focuses on public safety traffic and broadcasts, with low energy efficiency.

However, energy saving aspects become more import, e.g. regarding the use of unicast type communication, which can be also used for commercial traffic.

This proposal is to provide an energy saving mode or DRX solution, e.g. for Rel-13 ProSe communication or other D2D communication, e.g. for future network developments. Such energy-saving modes require and/or include wake-up procedures, to be able get from the energy-saving mode to more operationally useful modes.

There are described different wake-up procedures:
1) Alternative 1: it is a NW message that is used to wake-up the ProSe Rx UE (e.g. a message triggered by the NW or network node receiving a D2D communication request from a Tx UE);

2) Alternative 2: a UE-specific wake-up window or time period is used for or by the Tx UE to wake-up the ProSe Rx UE (e.g. by sending a wake-up signal);

The selection of the alternatives could be a function of: Coverage status, e.g., in-coverage, out of coverage, RRC states, e.g., e.g. RRC idle or RRC connected, Traffic type and/or UE category.

Alternative 1—NW-Assisted ProSe Wake-Up Procedure

In this alternative, ProSe UEs rely on NW to be activated, i.e., they just need to monitor NW signaling, e.g., paging message if they are in RRC idle state, to know if any ProSe traffic to be received. Thus, for ProSe Tx, in order to wake up a specific ProSe Rx, it may first establish connection with the NW, rely on the NW to identify and wake up the Rx UE. Specifically, the flow chart and detailed steps are listed as follows.

The NW here can be in different forms and/or comprise one or more different devices or network nodes:
- One alternative is it is limited to RAN entities, e.g., eNB, MME, SGW, PGW.
- Another alternative is it includes higher layer entities like ProSe-F, ProSe application server.

Figure 8:
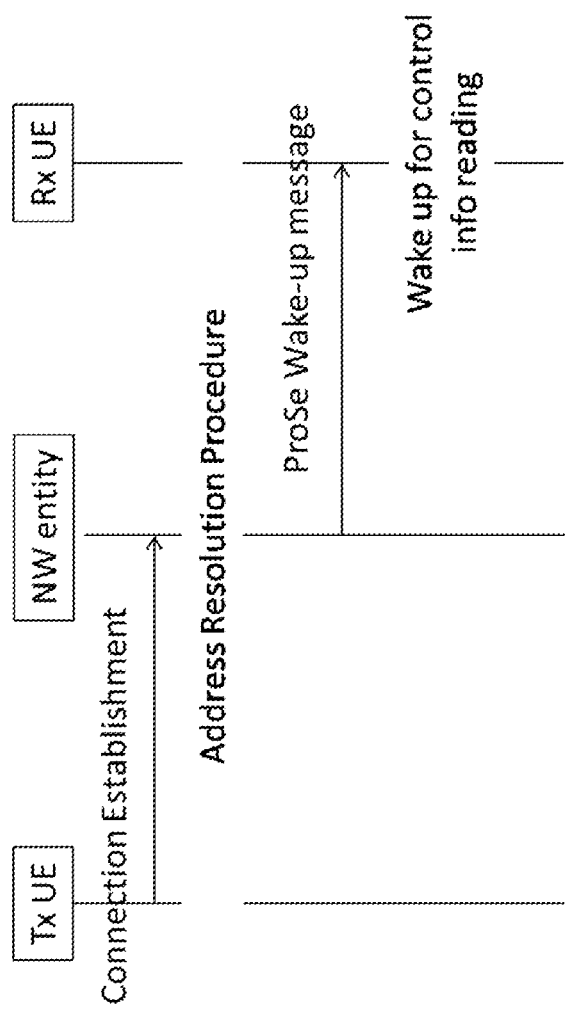
FIG. 8 shows a flow-chart of an exemplary wake-up procedure.

FIG. 8 shows a flow chart of Alternative 1.

Step 1 (optional): When there is ProSe data available in buffer of Tx. From a RAN (Radio Access Network) perspective, if the Tx UE is in RRC idle state, it needs to first establish RRC connection with NW. Or from application layer perspective, if the Tx UE has not establish connection with ProSe-F/application server, it needs to establish it as well.

Step 2: There is an address resolution procedure (e.g. performed by a network node or eNB, which may be adapted correspondingly and/or comprise a corresponding resolution module), in order to locate the Rx UE, which can be implemented using different alternatives, e.g.:

a. One alternative is, for Tx eNB, the destination ProSe ID (of the Rx UE) can be obtained from Tx UE, e.g., via MAC CE like BSR or RRC signaling. Then this information (destination ProSe ID) can by the TeNB be sent back to the core network or network node, which would then help to identify the location of Rx UE. Another alternative, the Tx UE transmits a message directly to the ProSe function, transparently through the TeNB, to request a wake up of the Rx UE. The ProSe function will then locate the Rx UE, based on existing methods, e.g. using EPC-level discovery as specified in TS 23.303, and if necessary, wakes up the UE using cellular paging from the MME. This method may also be used if the Tx UE and Rx UE are in different PLMNs.

Step 3: A message from the NW to Rx UE to wake up the Rx UE. The message could be in different forms, e.g., PHY layer DCI, MAC CE or RRC signaling, or application layer signaling (e.g., PC3 signaling from ProSe-F). Specifically, the ID info that is used in the wake-up message to identify the Rx UE can be:

For the content of the wake-up message, there could be different embodiments:
- Alt 1: Use the ProSe destination (Rx UE) address, e.g. unicast, group-cast or broadcast destination address, can be L1/L2 address or higher layer address like application layer address.
- Alt 2: Use a cellular address, e.g. C-RNTI (for RRC connected mode UEs) or S-TMSI (for RRC idle mode UEs).
- Or a mixed implementation, e.g., if the wake-up message is from application layer, carried by IP layer on user plane, so the wake-up message would trigger the cellular address based on wake up in RAN level as well (C-RNTI or S-TMSI based). If the Rx UE is in RRC idle state, this step may include a sub-step to page the Rx UE to locate it from tracking area level to eNB level. In case the Rx UE is in idle mode, the Rx UE monitors paging occasions according to its DRX cycle. The eNB may transmit a paging flag in the paging occasion of the Rx UE, respecting its DRX cycle, followed by a paging message. The paging message corresponds to the wake-up message in this case. And this paging operation would trigger the Rx UE to establish RRC connection between Rx UE and NW.

Step 3A: The UE receives the wake-up message and uses the address in the message as input to a matching rule. If there is a match, the UE wakes up. Examples of a matching rule is that the address in the wake up message is equal to the cellular address (e.g., C-RNTI/S-TMSI of the Rx UE) or ProSe address (e.g., a group-cast ProSe destination address for a group the UE participates in).

Step 4: The Rx UE starts reading the control channel from NW more frequently.

Alternative 2—Non-NW Assisted ProSe Wake-Up Procedure

In this alternative, there is no NW assistance available. For each ProSe UE, a DRX pattern is calculated based on its own information, e.g., ProSe UE ID or IMSI. So being aware of the ID of the dedicated receiver, ProSe Tx can know when this Rx UE would be active to monitor possible wake-up message. Thus, each ProSe Tx would send wake-up message according to the Rx UE specific DRX pattern, in order to wake up the Rx UE. Specifically, the flow chart and detailed steps are listed as follows.

Figure 9:
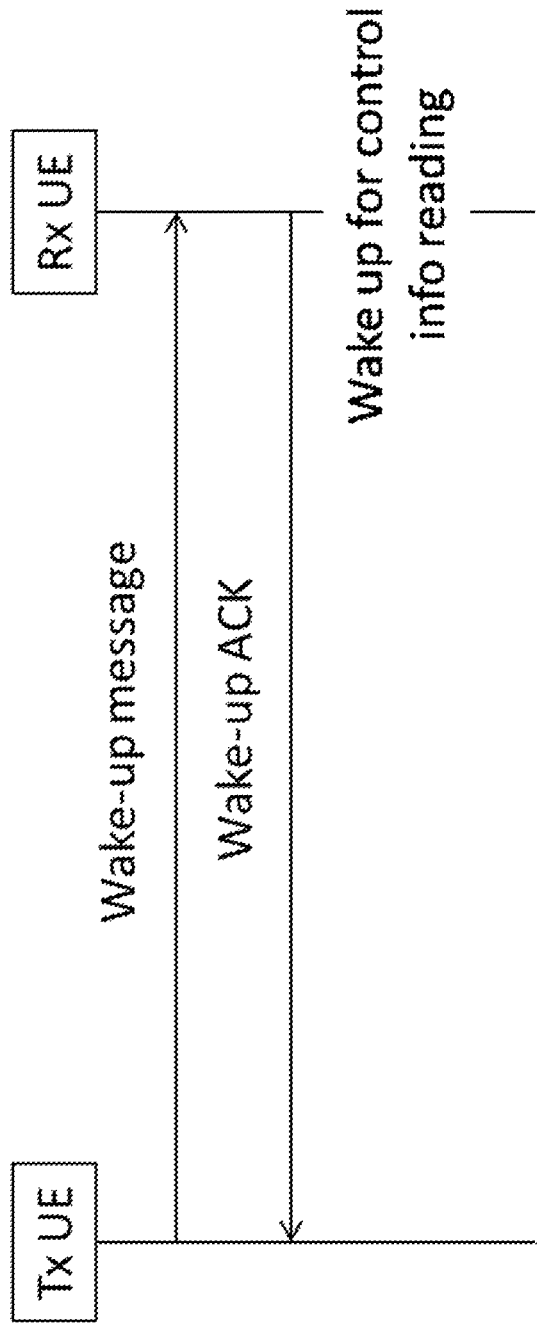
FIG. 9 shows a flow-chart of a second exemplary wake-up procedure.

FIG. 9 shows a flow chart of Alternative 2.

Step 1: Based on UE information, e.g. the ProSe ID of the Rx UE, which could be lower layer ID (e.g., L2 ID) or higher layer ID (IP address or the application layer ID), both the Tx UE and Rx UE can calculate a time when Rx UE would be active to monitor possible wake-up message, i.e., the UE-specific DRX pattern (which corresponds to monitoring at a or at pre-determined time/s). Accordingly, the pre-determined times may be based on UE information and/or a UE ID (identity, e.g. a number/information uniquely identifying the UE, e.g. uniquely within the network or cell or RAN).

Although the detailed calculation formula is out of the scope of this proposal and may be implemented in any applicable manner, the following are two examples:
- One example could be mod(UE ID, DRX periodicity), where UE ID is the unicast, group-cast or broadcast destination L1 and/or L2 address, DRX periodicity is the periodicity of DRX which can be pre-defined by the specification.
- Another example could be based on existing paging occasion/frame calculation method [2] (for FDD system), where the input includes Rx UE IMSI and some parameters from NW. This method ensures that the UE only needs to wake up once for both cellular (on DL spectrum) and d2d (on UL spectrum).

The reference timing can be obtained from the synchronization source.

Step 2: During this active time, the Rx UE wakes up from the sleep or energy saving mode (the length of the wake-up interval can be a pre-defined value or UE specific), and Tx UE sends the wake-up message to the Rx UE during the active time.

The wake-up message can be ProSe discovery signal, communication signal, or reference signal.

Step 3: A "wake-up ACK" feedback may be provided from Rx UE to Tx UE, in order for the Tx UE to know that the Rx UE has been activated, and be ready for subsequent communication with the Tx UE.

Step 4: The Rx UE starts reading the control channel from Tx UE more frequently.

The wake-up ACK message can be ProSe discovery signal, communication signal, or reference signal.

Figure 10:
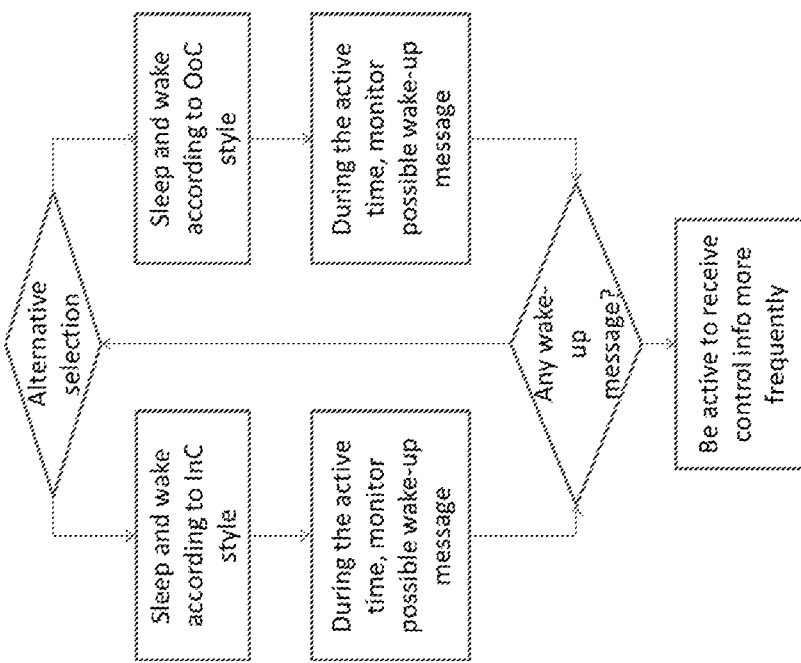
FIG. 10 shows a flow-chart of exemplary UE behaviour.

FIG. 10 shows a flow chart for Rx UE behavior.

Step 1 (optional): The selection of the alternatives could be a function of one or multiple factors in the following according to the status of ProSe Tx UE (Here the Rel-12 behavior can serve as one option for selection as well):

Coverage status, e.g., to select alternative 1 when in coverage, or alternative 2 when out of coverage.

RRC states, e.g., to select alternative 1 when in RRC connected mode, or alternative 2 when in RRC idle mode.

Traffic type, e.g., to select alternative 1 or 2 when the traffic is commercial traffic, or Rel-12 alternative when the traffic is PS type traffic.

UE category, e.g., to select alternative 1 or 2 when the UE category is Rel-13, or Rel-12 alternative when the UE is Rel-12 category.

Step 2: Sleep and wake up (after/due to entering an energy saving mode) according to the selected alternatives, to monitor possible wake-up message. It is possible that the UE monitor wake-up is based on both alternatives, e.g., one on DL spectrum and the other on UL spectrum.

Step 3: according to whether the wake-up message is identified during the active time (receiver turned on), different operations would be done:

If no, the UE would go back to the sleep mode. And before that, an optional step is to again evaluate the selection of alternatives, to see which alternative should be used later.

if yes, the UE would be active for control channel monitoring more frequently.

There is described a method for operating a wireless device, the wireless device being D2D enabled, wherein the method comprises:

entering, by the wireless device, an energy-saving mode, which may be performed by an energy saving entering module;

monitoring, by the wireless device, a pre-defined channel for a D2D wake-up signal at pre-defined times during the energy-saving mode, which may be performed by a monitoring module;

determining, by the wireless device, if a received wake-up signal is intended for the wireless device, which may be performed by a determining module;

performing, by the wireless device, a wake-up procedure for D2D communication, which may be performed by a wake-up module.

The D2D wake-up signal may be received from a network node or from another D2D enabled wireless device or UE.

The method may further comprise obtaining, by the wireless device, of an indication of the pre-defined times. The indication may be obtained from a network or network node and/or from a memory of the wireless device, e.g. a controlling node. The indication may be obtained before entering the energy saving mode. The indication may be obtained with a configuration, which may be configured by the network or network node.

Monitoring and/or determining and/or performing the wake-up procedure may be based on and/or according to a configuration, which may be configured by the network, in particular a network node like a base station (an eNodeB, for example).

A Tx UE may send and/or be adapted to send and/or comprise a sending module for sending a D2D communication request. Such a request may comprise or be a message indicating to a network, e.g. network node, a target UE or Rx UE for D2D communication as described herein. A network node or network may be adapted for and/or comprise a waking module for, waking up a wireless device or Rx UE in response to receiving a D2D communication request.

Waking up a wireless device may comprise sending a wake-up signal to a wireless device, e.g. on a pre-defined channel, which may be the pre-defined channel the wireless device in configured for monitoring and/or monitors in the energy-saving mode.

A wake-up signal may comprise a wake-up message and/or indicate to a Rx UE to wake-up for D2D-communication, e.g. by performing a wake-up procedure.

Performing a wake-up procedure may be based on determining that the wake-up signal is intended for the wireless device. For example, the wake-up procedure may be performed only if the signal is determined to be intended for the wireless device.

A wake-up procedure and/or the method for operating a wireless device may generally comprise configuring the wireless device (and/or turning on a receiver) to receive allocation and/or configuration data, in particular a scheduling assignment, which may be an assignment for reception of D2D transmission or data, e.g. from a Tx UE. This may be performed at pre-determined scheduling times/s. The scheduling assignment may be determined and/or transmitted by a network or network node, e.g. an eNB, which may be adapted accordingly and/or comprise a corresponding scheduling module. The method or wake-up procedure may comprise turning on a receiver at pre-determined times for receiving allocation data and/or control information and/or scheduling assignment, while turning it off at other times. After receiving the allocation data or control information or scheduling assignment (e.g. from a network or network node), the method or wake-up procedure may comprise turning on the receiver to receive D2D data or communication, e.g. from a Tx UE. The method for operating a wireless device or a wake-up procedure may generally comprise two or more steps, wherein in at least a first step a receiver is turned on at different times and/or for less time (of a given period or time scale, e.g. frame or subframe) than at a second step. The first step may correspond to receiving (and/or turning on for receiving) allocation data and/or scheduling assignment. The second step may correspond to receiving (and/or to turning on for receiving) D2D data or transmission.

In a further example the method for operating a wireless device or the wake-up procedure determines different Rx UE behaviors in terms of at least turning on the receiver circuit and/or associated processing under different conditions, as explained in the following. In one example a UE that is monitoring incoming wake-up signals but that has not yet received a wake-up signal of interest does not need to monitor data channels as well as scheduling assignments over the D2D resources. Once the UE receives an interesting wake-up signal it starts monitoring at least scheduling assignment resources associated to the received wake-up signal. The scheduling assignment resources are monitored at least until a certain timer expires or until certain conditions apply. Once the UE stops monitoring such scheduling assignment resources it returns to the initial state where it was monitoring at least the wake-up signals. The aforementioned timer may be determined in the specifications or signaled by the network in any way. The timer may be triggered by reception of a wake-up signal. The aforementioned conditioned may include reception of new data or scheduling assignments over the D2D resources associated to a certain received wake-up signal. If no new resources are scheduled and/or received for a certain time period, the UE stops monitoring the scheduling assignment resources. Such time period may also be defined by a timer triggered by reception of scheduling assignments and/or data, where the duration of the time may be pre-defined in a specification or signaled by the network. A further example condition may be the reception of a new wake-up signal that indicates to the receiver that it may stop monitoring scheduling assignment resources.

Additionally, once an interesting scheduling assignment is received, the UE starts to receive at least some of the data resources indicated by the scheduling assignment. There is generally disclosed a method for operating a wireless device or user equipment (UE), which may be a D2D or ProSe-enabled. There is also disclosed a wireless device or user equipment adapted to carry out any method for operating a wireless device or user equipment described herein. The wireless device or user equipment may generally comprise suitable modules to carry out steps of the method. There may be considered a method for carrying out any step or any combination of steps for operating a Tx UE and/or a correspondingly adapted wireless device, which may have one or more modules, each module adapted for performing a step of the method. There may be considered a method for carrying out any step or any combination of steps for operating a Rx UE and/or a correspondingly adapted wireless device, which may have one or more modules, each module adapted for performing a step of the method. There may be considered a method for carrying out any step or any combination of steps for operating a network node and/or a correspondingly adapted network node, which may have one or more modules, each module adapted for performing a step of the method.

Moreover, there is disclosed a method for operating a network node (in particular an eNodeB), which may be a controlling node. There is also a disclosed network node, in particular an eNodeB and/or controlling node, adapted to carry out any method for operating network node or eNodeB described herein. The network node may generally comprise suitable modules to carry out steps of the method. A method for operating a network node may comprise, and/or the network node may be adapted for and/or comprise a configuring module for, configuring a wireless device for performing a method as disclosed herein. Configuring may comprise configuring the wireless device with a corresponding configuration, which may for example indicate the pre-defined times and/or pre-defined channel. Alternatively, or additionally, a method for operating a network node may comprise, and/or the network node may be adapted for and/or comprise a waking module for, transmitting a wake-up signal to the a wireless device. Transmitting a wake-up signal may be based on receiving a message. The network node may be adapted for such receiving and/or comprise a corresponding receiving module. The message may be a D2D request indicating a request for D2D communication with the wireless device, e.g. received from another/second D2D enabled wireless device.

A program product comprising code executable by control circuitry is described, the code causing the control circuitry to perform and/or control any one method disclosed herein, in particular a method for operating a UE or a network node, in particular if running on control circuitry of the UE or the network node.

There is also disclosed a carrier medium arrangement carrying a program product according as described herein and/or code executable by control circuitry, the code causing the control circuitry to perform and/or control any one method disclosed herein. A carrier medium arrangement may comprise at least one carrier medium. The program product may be distributed over more than one carriers, so that e.g. different parts of the program product are stored or carried on different media.

There may generally be considered a wireless device adapted for carrying out any of the methods for operating a wireless device described herein. A network node adapted for carrying out any of the methods for operating a network node described herein may be envisaged.

A network node may be implemented as an eNodeB, in particular according to LTE. The network node may be adapted for, and/or comprise a receiving module for, receiving a report from a wireless device, and/or to relay the report to higher layers of the network and/or an operator billing service.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In this specification, UE or user equipment may be used as an example for or interchangeably with wireless device. eNode or base station may be used as an example for or interchangeably with network node.

In some examples, the terms 'device-to-device', 'D2D' and 'proximity service' (ProSe) and even 'peer-to-peer communication' may be used interchangeably.

A wireless device being D2D enabled or D2D UE or D2D device may be a wireless device enabled for D2D and may interchangeably be called UE or D2D-capable UE. An entity like a wireless device or UE that is D2D enabled may comprise any entity capable of at least receiving or transmitting radio signals on a direct radio link, e.g., between this entity and another D2D capable entity. A wireless device or D2D device may also be and/or be comprised in a cellular UE, PDA, a wireless device, laptop, mobile, sensor, relay, D2D relay, or even a small base station employing a UE-like interface, etc. A D2D device is able to support at least one D2D operation. D2D operation may comprise any action or activity related to D2D, e.g., transmitting or receiving a signal/channel type for D2D purpose, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service.

Cellular operation and wireless access network (WAN) operation may be used interchangeably herein.

A D2D receive operation (e.g., receiving any signal or channel, with or without decoding, sensing on carrier frequency or specific resources or for a specific channel/signal, etc.) may be comprised in a D2D operation which may, in one example, also involve other than D2D receive operations.

Cellular operation (by UE) may comprise any action or activity related to cellular network (any one or more RATs). Some examples of cellular operation may be a radio signal transmission, a radio signal reception, performing a radio measurement, performing a mobility operation or RRM related to cellular network.

Generally, a UE may be considered as an example or representative of a D2D device or a D2D enabled wireless device, and the term wireless device being D2D enabled or D2D enabled wireless device may be interchanged for UE unless explicitly stated otherwise.

An eNodeB or eNB or base station may be considered to be one variant of a network node, in particular a controlling node.

Figure 2:
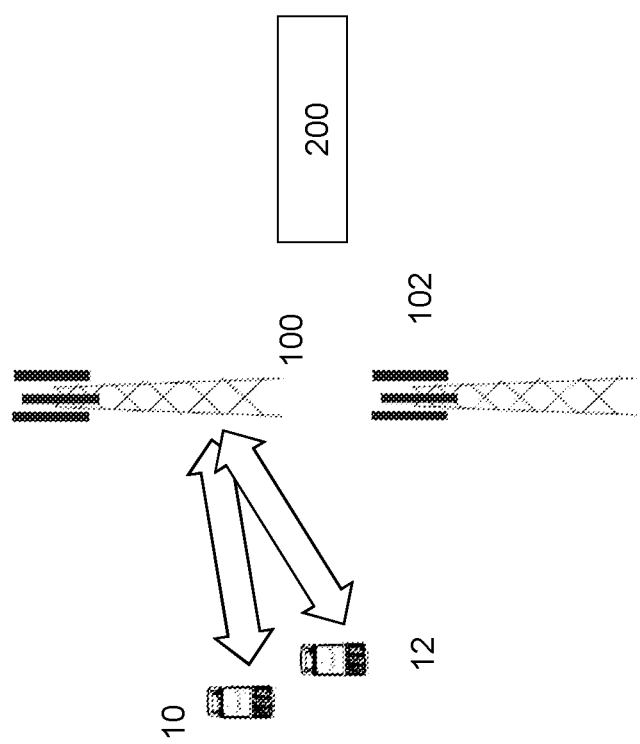
FIG. 2 shows an exemplary second communication link setup.
Figure 3:
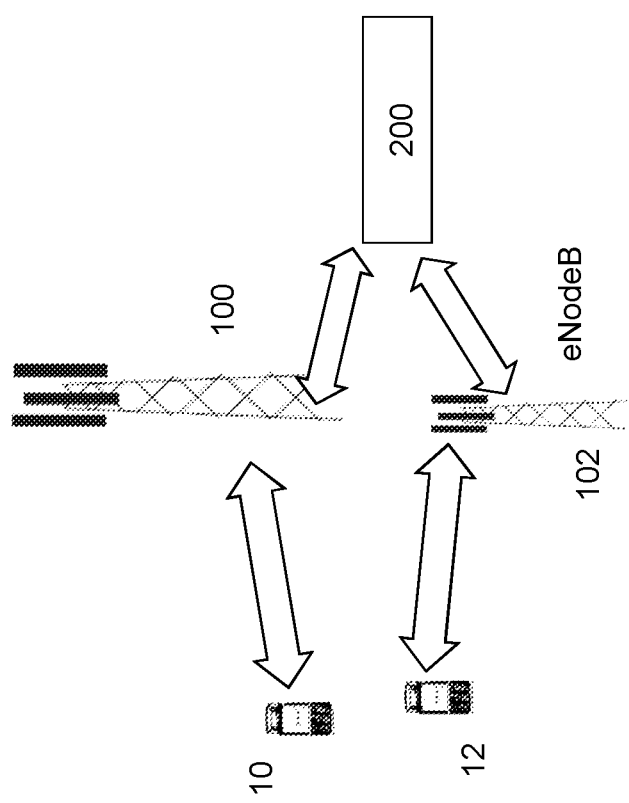
FIG. 3 shows an exemplary third communication link setup.

In FIGS. 1 to 3, there are shown different setups for communication of user equipments (as examples for D2D devices) within a mobile communication network. In these figures, the first node or first user equipment UE1 is indicated with reference numeral 10, the second node or second user equipment is indicated with reference numeral 12. A first base station or network node, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating or controlling nodes for D2D communication between the UEs 10, 12. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 10, 12 are in proximity to each other, they may be able to use a "direct mode" (e.g., as in FIG. 1) or "locally-routed" (e.g., as in FIG. 2) or assisted path for data communication as forms of D2D or direct or direct link communication, unlike in the conventional cellular communication (FIG. 3).

Figure 4:
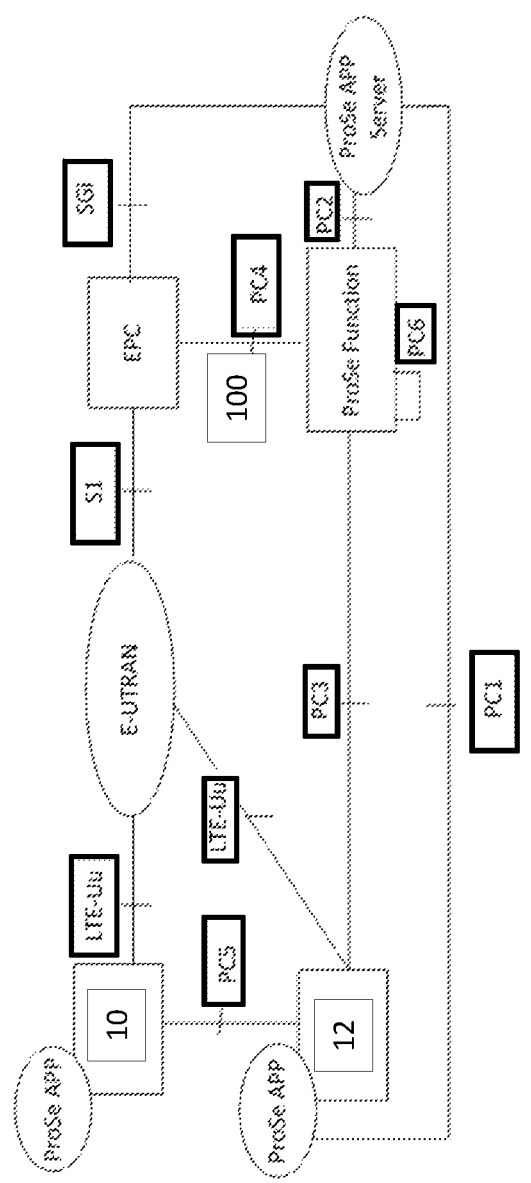
FIG. 4 shows an exemplary general D2D architecture.

A more detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on an D2D device or UE 10 or 12, PC2 a reference point between an ProSe Application server and a ProSe function provider on a server or base station side. PC3 indicates a reference point between the D2D device or UE 12 and the ProSE function, e.g. for discovery and/or communication. PC4 refers to a reference point between the EPC and the ProSe function, e.g. for setting up setting up one-to-one communication between UEs 10 and 12. PC5 is a reference point between D2D device or UE 10 and D2D device or UE 12, e.g. a first node and a second node involved in D2D communication, which may be used e.g. for direct or relayed communication between the UEs. PC6 identifies a reference point between ProSE functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
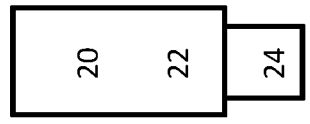
FIG. 5 shows an exemplary D2D-enabled wireless device.

FIG. 5 schematically shows a D2D device or user equipment 10, which may be a node of or for a device-to-device communication, in closer details. User equipment 10 comprises control circuitry 20, which may comprise a controller connected to a memory. A receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
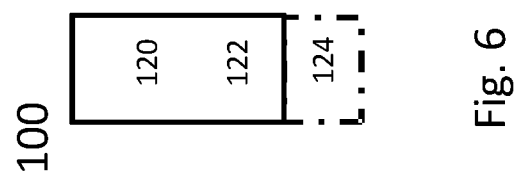
FIG. 6 shows an exemplary network node.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

D2D transmission may be any transmission by a D2D device in D2D operation. Some examples of D2D transmission are physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link is intended for receiving by another D2D device. A D2D transmission may be a unicast, groupcast, or broadcast transmission. A D2D transmission may be on the uplink time-frequency resources of a wireless communication system.

A coordinating or controlling node may be a network node that schedules, decides, at least in part, or selects time-frequency resources to be used for at least one of: cellular transmissions and D2D transmissions. The coordinating node may also provide the scheduling information to another node such as another D2D device, a cluster head, a radio network node such as eNodeB, or a network node (e.g. a core network node, MME, positioning node, D2D server, RNC, SON, etc.). The coordinating node may communicate with a radio network node. The coordinating node may also perform coordination for one or more D2D devices or UEs. The coordination may be performed in a centralized or distributed manner.

Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology): e.g. LTE FDD, LTE TDD, GSM, CDMA, WCDMA, WiFi, WLAN, WiMAX, etc.

Generally, there may be considered a D2D device adapted to perform any one of the methods for operating a D2D device described herein. The D2D device may comprise suitable circuitry, e.g. control circuitry, e.g. for controlling a method, and/or transmitter/s and/or receiver/s and/or corresponding circuitry and/or antenna circuitry. There may be considered a network node adapted to perform any one of the methods for operating a network node described herein. The network node may comprise suitable circuitry, e.g. control circuitry, e.g. for controlling a method, and/or transmitter/s and/or receiver/s and/or corresponding circuitry and/or antenna circuitry Any of the D2D devices or UEs described herein (in particular, UE1 and UE2), may be a D2D device or UE for and/or of a wireless communication network, and/or adapted for cellular operation with a wireless communication network and/or for D2D operation.

Any of the network nodes (which in particular may be eNodeBs) described herein (in particular NW), may be a network node for and/or of a wireless communication network, and/or adapted for cellular operation with a wireless communication network, and/or at least one D2D device or UE, and/or for D2D operation and/or control of D2D operation, in particular with or of at least one D2D device or UE.

Additionally or alternatively, there may generally be considered a controlling node adapted to perform any one of the methods for operating a network node described herein.

A controlling node or network node may generally be implemented as base station or eNodeB.

According to a further aspect, there is provided a program product comprising code executable by control circuitry, the code causing the control circuitry to perform and/or control any one of the methods described herein.

Moreover, there is described, according to another aspect, a carrier medium carrying any one of the program products described herein and/or code executable by control circuitry, the code causing the control circuitry to perform and/or control any one of the methods as described herein.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A mobile communication network may generally comprise one or more than one network nodes, in particular a controlling node as described herein, and/or a radio access network (which may comprise the one or more than one network nodes) and/or a core network connected or connectable to the radio access network. The network and/or controlling node may be adapted to provide one or more cells for wireless and/or radio communication and/or to serve one or more D2D devices or UEs. A mobile communication network may be a cellular network. The controlling node may be adapted for controlling and/or serving and/or provide and/or support cellular communication and/or D2D communication.

Configuring a D2D device may involve instructing and/or causing the D2D device to change its configuration, e.g. at least one setting and/or register entry and/or operational mode. Configuring a D2D device for D2D measurement may refer to instructing and/or causing the D2D device to change operational parameters for D2D measurement, in particular according to a measurement performance characteristic. A D2D device may be adapted to configure itself. Configuring a D2D device by another device or node or network may refer to and/or comprise transmitting information and/or data and/or instructions to the D2D device by the other device or node or network, e.g. a D2D configuration and/or data regarding transmitter/s and/or receiver/s and/or data based upon which the configured or receiving D2D device may determine at least one transmitter and/or receiver to use, e.g. data indicating a preferred spectrum and/or frequency and/or carrier to be used. Configuring may involve changing one or more parameters and/or settings of the D2D device, in particular regarding transmitter/s and/or receiver/s.

Adapting a configuration may refer to configuring the D2D device, in particular by changing the configuration, e.g. by the D2D device.

Obtaining data may comprise receiving, e.g. from another node and/or device and/or the network, the data. Determining a transmitter and/or receiver for D2D operation may comprise selecting and/or configuring the transmitter and/or receiver for D2D operation. Configuring a radio resource like a transmitter or receiver may include adapting it for a desired operation, e.g. D2D operation, for example by tuning its operation parameters, e.g. frequency, bandwidth, power level, sensitivity, etc.

A D2D device may be considered to be connected or connectable for communication if it is able to communicate with another node or device or a network via wireless communication, in particular via D2D communication and/or cellular communication, e.g. if it is registered or may be registered in the network or with another D2D device, and/or is in such communication. Generally, a D2D device may be adapted for D2D operation and cellular operation, either in parallel or alternatively.

Receiving or transmitting, e.g. in the context of configuring the D2D device, may generally be performed via cellular communication and/or D2D communication, if the mode is not explicitly mentioned.

Some abbreviations used are:
3GPP 3$^{rd}$ Generation Partnership Project
Ack/Nack Acknowledgment/Non-Acknowledgement, also A/N AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a wireless device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
IMSI International Mobile Subscriber Identity
L1 Layer 1
L2 Layer 2
LTE Long Term Evolution, a telecommunications or wireless or mobile communication standard
MAC Medium Access Control
MBSFN Multiple Broadcast Single Frequency Network
MDT Minimisation of Drive Test
MPC Measurement Performance Characteristic
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PLMN Public Land Mobile Network
ProSe Proximity Service/s, another name for D2D
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SIB System Information Block
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UICC Universal Integrated Circuit Card; card used for mobile/cellular communication in a UE
UL Uplink; generally referring to transmission of data to a node/into a direction closer to a network core (physically and/or logically); in particular from a wireless device or UE to a base station or eNodeB; in the context of D2D, it may refer to the spectrum/bandwidth utilized for transmitting in D2D, which may be the same used for
UL communication to a eNB in cellular communication; in some D2D variants, transmission by all devices involved in D2D communication may in some variants generally be in UL spectrum/bandwidth/carrier/frequency
RRC Radio Resource Control
DRX Discontinuous Reception
PDCCH Physical Downlink Control CHannel
ProSe Proximity Service
IMSI International Mobile Subscriber Identity
CSI Channel State Information
CE Control Element These and other abbreviations may be used according to LTE standard definitions as applicable.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a Wireless device and/or user equipment and/or base station and/or relay node and/or any device generally adapted for device-to-device communication. A wireless communication network may comprise at least one of a device configured for device-to-device communication, a wireless device, and/or a user equipment and/or base station and/or relay node, in particular at least one user equipment, which may be arranged for device-to-device communication with a second wireless device or node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A wireless device or user equipment (UE) may generally be a device configured for (wireless) device-to-device communication (it may be a wireless device) and/or a terminal for a wireless and/or cellular network, in particular a mobile terminal, for example a mobile phone, smart phone, tablet, PDA, etc. A user equipment may be a node of or for a wireless communication network as described herein, in particular a wireless device. It may be envisioned that a wireless device user equipment or wireless device is adapted for one or more RATs, in particular LTE/E-UTRA. A user equipment or wireless device may generally be proximity services (ProSe) enabled, which may mean it is D2D capable or enabled. It may be considered that a user equipment or wireless device comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or wireless device. It may be considered that a user equipment is configured to be a user equipment adapted for LTE/E-UTRAN.

A network node may be a base station, which may be any kind of base station of a wireless and/or cellular network adapted to serve one or more wireless device or user equipments. It may be considered that a base station is a node of a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

Device-to-device (D2D) communication or operation may generally refer to communication between nodes or wireless devices of or for a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or controlling node and/or with a base station or controlling node providing merely auxiliary services, e.g. configuration data or a transmission configuration or related information for a message intended for device-to-device communication between user equipments. D2D communication may be communication between two wireless devices in a region without cellular coverage and/or without interaction with a cellular or mobile network. In the latter case, it may be considered that data and/or signals flowing between the nodes performing device-to-device communication are not transported via a base station and/or controlling node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A device configured for and/or capable of device-to-device communication, which may be called wireless device or D2D enabled node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more wireless devices, in particular to a first wireless device. Accordingly, D2D resource allocation may be performed by the network and/or by a node, in particular a node within and/or within a cell of a cellular network covering the wireless devices participating or intending to participate in the D2D communication.

Allocation data may be considered to be data indicating and/or granting resources allocated by the controlling or allocation node, in particular data identifying or indicating which resources are reserved or allocated for D2D communication for a wireless device and/or which resources a wireless device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception, in particular regarding D2D operation. A scheduling assignment may be considered to represent scheduling data and/or be seen as an example of allocation data. A scheduling assignment may in particular refer to and/or indicate resources to be used (e.g. by the intended target UE or Rx UE) for D2D communication or operation, in particular for the reception of D2D transmission from another or source UE (e.g. Tx UE).

In the context of this description, a user equipment or wireless device generally may be a device capable of D2D communication and/or operation, in particular using frequencies and/or resources of a cellular and/or licensed communication system, e.g. a system according to a LTE standard, and may be also referred to as D2D enabled or capable UE or node.

A wireless device may comprise any entity or equipment or device or node capable of at least receiving and/or transmitting radio signals on a direct radio link, i.e., between the entity and another D2D capable entity or wireless device. A wireless device or wireless device may for example be comprised in or comprise a cellular UE, PDA, a wireless device, laptop, mobile, sensor, relay, D2D relay, a small base station employing a UE-like interface, etc.

Any device or entity capable to support and/or perform at least one D2D operation may be considered a wireless device; a wireless device may be adapted to support and/or perform at least one D2D operation. A wireless device may generally be adapted for cellular operation and/or communication in a wireless communication network. It may be considered that a wireless device generally comprises radio circuitry and/or control circuitry for wireless communication, in particular D2D operation or communication and cellular operation or communication. A wireless device may comprise a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably with D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

ProSe or D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a wireless device or UE. A D2D receive operation may comprise receiving, by a wireless device or UE, of D2D data and/or signals. A D2D transmit operation may comprise, transmitting, by a wireless device or UE, of D2D data and/or signals. A wireless device performing at least one ProSE/D2D operation may be considered to be in D2D or D2D mode or in D2D operation. D2D operation may comprise D2D measurements. A user equipment adapted to perform at least one type of ProSe/D2D operation may be considered to be ProSe/D2D-enabled.

A D2D measurement may be a measurement, e.g. performed by a wireless device, performed for D2D purpose and/or on D2D signals/channels and/or regarding D2D operation and/or communication. D2D measurement may comprise any one or any combination of: D2D RRM measurement, D2D positioning measurement, D2D synchronization measurement, measurement on D2D synchronization signals, measurement on D2D reference signals, measurement on D2D channel/s, signal-to-noise measurement, signal strength measurement, signal quality measurement, in particular measurement of received signal strength, of received signal quality, RLM, synchronization, one-directional and/or two-directional timing measurement, RTT or Rx-Tx or similar measurement, measurement of number of successful and/or unsuccessful channel decodings or receptions, data throughput measurements, measurement of amount of data transmitted and/or received, billing-relevant measurement; these measurement may be performed regarding D2D communication and/or D2D operation.

Cellular operation (in particular by a wireless device or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission or communication may be any transmission or communication by a wireless device or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another wireless device. A D2D transmission may be a unicast, groupcast, or broadcast transmission. A D2D transmission may be on the uplink time-frequency resources of a wireless communication system.

A network node may be a controlling node connected or connectable to a UE for cellular and/or D2D communication. A controlling node may be defined by its functionality of configuring the UE device, in particular in regards to measuring and/or reporting data pertaining to D2D operation, and/or for defining and/or allocating and/or configuring one or more than one resource pools, in particular resource pools for ProSe operation and/or ProSe discovery. A controlling node may be a network node that is adapted to schedule, decide and/or select and/or allocate, at least in part, time-frequency resources to be used for at least one of: cellular communication or transmissions and D2D communication or transmissions.

The controlling node may also provide scheduling information to another node, such as another wireless device, a cluster head, a radio network node such as eNodeB, or a network node (e.g. a core network node), MME, positioning node, D2D server, RNC, SON, etc). The network node or controlling node may be or communicate with a radio network node. It may be envisioned that a controlling node may also perform coordination and/or control for one or more wireless device or UEs. The coordination and/or control may be performed in a centralized or distributed manner. A controlling node may be referred to as an allocating node and/or a coordinating node.

A network device or node and/or a wireless device may be or comprise a software/program arrangement arranged to be executable by a hardware device, e.g. control circuitry, and/or storable in a memory, which may provide D2D functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may generally be a radio network node (which may be adapted for wireless or radio communication, e.g. with a wireless device or a UE) or another network node, e.g. an eNodeB. A network node generally may be a controlling or allocating node; an eNodeB defining and/or configuring one or more resource pools may be seen as controlling or allocating node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a wireless device or UE, if it provides a cell of a cellular network to the served node or wireless device or UE and/or is connected or connectable to the wireless device or UE via and/or for transmission and/or reception and/or UL and/or DL data exchange or transmission and/or if the network node is adapted to provide the wireless device or UE with allocation and/or configuration data and/or a measurement performance characteristic and/or to configure the wireless device or UE.

A wireless device may generally be a node or device adapted to perform D2D communication, in particular transmission and/or reception, and/or at least one type of D2D operations. In particular, a wireless device may be a terminal and/or user equipment and/or D2D enabled machine and/or sensor. The wireless device may be adapted to transmit and/or receive D2D data based on allocation data, in particular on and/or utilizing resources indicate in the allocation data. D2D communication and/or transmission by a wireless device may generally be in UL resources and/or corresponding carrier or frequency and/or modulation. A wireless device (such as a UE) may be adapted for and/or capable of CA or CA operation. In particular, it may be adapted to transmit and/or receive one or more than one CCs and/or utilising, and/or participating in, carrier aggregation. A wireless device may be adapted to configure itself and/or be configured according to configuration data, which may include setting up and/or scheduling resources and/or equipment for receiving and/or transmitting and/or sharing of resources and/or in particular D2D operation and/or cellular operation based on the configuration data. Configuration data may be received, by the wireless device, from another node or wireless device, in particular a network node.

A network node may generally be adapted to provide and/or determine and/or transmit configuration data, in particular to a wireless device. Configuration data may be considered to be a form of allocation data and/or may be provided in the form of a message and/or data packet/s. Configuring a wireless device or UE, e.g. configuring of the node by a network node, may include determining and/or transmitting configuration data to the node to be configured, i.e. the wireless device or UE. Determining the configuration data and transmitting this data to a wireless device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Cellular DL operation and/or communication of a wireless device or UE may refer to receiving transmissions in DL, in particular in cellular operation and/or from a network node/eNB/base station. Cellular UL operation of a wireless device or UE may refer to UL transmissions, in particular in cellular operation, e.g. transmitting to a network or network node/eNB/base station.

Configuring a, or by a, wireless device may comprise setting one or more parameters and/or registers of the wireless device and/or tune and/or set one or more components or subsystems and/or circuitry, e.g. a control circuitry and/or radio circuitry, in particular to bring the wireless device into a desired operation mode, e.g. for transmitting and/or receiving data according to allocated resources and/or as scheduled by a network node and/or to be configured for communication via or with one or more cells of a cellular network and/or one or more than one ProSe enabled devices. A wireless device may be adapted for configuring itself, e.g. based on configuration and/or allocation data, which it may receive from a network or network node.

Each or any one of the wireless devices or user equipments described or shown may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the network nodes or controlling nodes or eNBs or base stations described or shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

The invention claimed is:

1. A method for operating a wireless device, the wireless device being enabled for device-to-device (D2D) operation, wherein the method comprises:
   entering, by the wireless device, an energy-saving mode;
   monitoring, by the wireless device, a pre-defined channel for a D2D wake-up signal at pre-defined times during the energy-saving mode;
   determining, by the wireless device, whether a received wake-up signal is intended for the wireless device; and
   performing, by the wireless device, a wake-up procedure of a plurality of wake-up procedures for D2D communication,
      wherein said wake-up procedure is performed based on a selection of said wake-up procedure from the plurality of the wake-up procedures,
      wherein the plurality of wake-up procedures includes a network node assisted Proximity Services (ProSe) wake-up procedure and a non-network node assisted Proximity Services (ProSe) wake-up procedure,
      wherein said wake-up procedure is a function of plurality of factors according to a status of transmitting Tx UE, and
      wherein the plurality of factors comprises coverage status, Radio Resource Control (RRC) states, Traffic type and UE category.

2. A method for operating a network node in a wireless communication network, the method comprising at least one of configuring a D2D enabled wireless device for at least one of the plurality of wake-up procedures and performing a method according to claim 1.

3. A network node for a wireless communication network, the network node configured to perform at least one of configuring a D2D enabled wireless device for at least one of the plurality of wake-up procedures and performing a method according to claim 1.

4. A wireless device for a wireless communication network, the wireless device being enabled for device-to-device (D2D) operation, wherein the wireless device comprises:
   a control circuit; and
   memory operatively connected to the control circuit and storing program code executable by the control circuit, wherein the wireless device is configured to:
   enter an energy-saving mode;
   monitor a pre-defined channel for a D2D wake-up signal at pre-defined times during the energy-saving mode;
   determine whether a received wake-up signal is intended for the wireless device; and
   perform a wake-up procedure of a plurality of wake-up procedures for D2D communication,
      wherein said wake-up procedure is performed based on a selection of said wake-up procedure from the plurality of the wakeup procedures,
      wherein the plurality of wake-up procedures includes a network node assisted Proximity Services (ProSe) wake-up procedure and a non-network node assisted Proximity Services (ProSe) wake-up procedure,
      wherein said wake-up procedure is a function of plurality of factors according to a status of transmitting Tx UE, and
      wherein the plurality of factors comprises coverage status, Radio Resource Control (RRC) states, Traffic type and UE category.

5. A non-transitory computer-readable medium comprising, stored thereupon, a code executable by control circuitry of a wireless device enabled for device-to-device (D2D) operation, the code causing the control circuitry to control the wireless device to:
   enter an energy-saving mode;
   monitor a pre-defined channel for a D2D wake-up signal at pre-defined times during the energy-saving mode;
   determine whether a received wake-up signal is intended for the wireless device; and
   perform a wake-up procedure for D2D communication,
      wherein said wake-up procedure is performed based on a selection of said wake-up procedure from a plurality of the wake-up procedures,
      wherein the plurality of wake-up procedures includes a network node assisted Proximity Services (ProSe) wake-up procedure and a non-network node assisted Proximity Services (ProSe) wake-up procedure,
      wherein said wake-up procedure is a function of plurality of factors according to a status of transmitting Tx UE, and
      wherein the plurality of factors comprises coverage status, Radio Resource Control (RRC) states, Traffic type and UE category.

* * * * *